United States Patent [19]
Nunez

[11] 3,890,722
[45] June 24, 1975

[54] MOTION SIMULATOR
[76] Inventor: Daniel Nunez, 2326 Stafford Rd., Thousand Oaks, Calif. 91360
[22] Filed: Sept. 4, 1973
[21] Appl. No.: 394,024

[52] U.S. Cl. ................. 35/12 P; 35/12 D; 35/12 E
[51] Int. Cl. ............................................. G09b 9/08
[58] Field of Search........ 35/12 R, 12 P, 12 D, 12 E

[56] References Cited
UNITED STATES PATENTS
3,597,857   8/1971   Akister et al........................ 35/12 P

*Primary Examiner*—John H. Wolff
*Attorney, Agent, or Firm*—Richard S. Sciascia; Joseph M. St. Amand; Darrell E. Hollis

[57] ABSTRACT

A motion simulator capable of motion in a plurality of degrees of freedom is provided having four variable-centered pulley wheels. Four support lines, one end of each attached to a fixed point and the other end of each attached to a suspended platform, pass over said pulley wheels and an idler arm. Variable-speed power means drive said pulley wheels, imparting a rotating motion thereto about said variable center. Said support lines move with respect to said variable-centered pulley wheels, thus imparting predetermined motion to said platform.

18 Claims, 17 Drawing Figures

PATENTED JUN 24 1975

3,890,722

SHEET 1

ONE END FIXED, ONE END UP/DOWN

ALL POINTS IN UP AND DOWN SIMULTANIOUS MOTION

PITCHING MOTION, HORIZONALLY STABLE

PITCHING/VERTICAL UP AND DOWN MOTION

UP AND DOWN WITH FORWARD BACKWARD MOTION

LATERAL MOTION WITH STABLE SURFACE

PITCHING MOTION ON FIXED CENTRAL POINT

PITCHING/UP AND DOWN WITH ROLLING MOTION

UP AND DOWN WITH ROLLING AND UNDULATION

FOWARD/BACKWARD MOTION WITH STABLE SURFACE

END YAWL MOTION STABLE CENTER

COMBINATION OF ALL STANDARD MOTIONS

MOTION SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the invention

The present invention relates generally to a motion simulator and, more particularly, to a motion simulator for imparting motion in a plurality of degrees of freedom to a platform.

2. Description of the Prior Art

Some prior art motion simulators utilize a number of hydraulically actuated, extensible members suitably connected between a fixed base and the station to be moved in a controlled manner. The hydraulic actuators offer a number of advantages and conveniences in the construction of such motion systems but suffer from the disadvantage of enormous power requirements and highly-concentrated, floor loads as the weight of the station to be moved increases. Although the provisions of power supplies and mounting systems to withstand the heavy loads are within the present state of the art, the greatly increased cost and safety hazards associated therewith are apparent. Moreover, because of the massiveness and weight of such motion simulators, they have not been movable to different locations. In addition, there is the constant threat of a line break and the normal leakage inherent in hydraulic systems poses a constant problem.

Other prior art motion simulators utilize buoyant elements to provide an upward force on a platform, thereby eliminating the necessity of utilizing additional hydraulic actuators. Such systems still suffer from the disadvantages discussed supra with respect to systems employing hydraulic actuators. Moreover, the addition of buoyant elements significantly increases the size and weight of the motion simulator, thus increasing space requirements as well as decreasing the mobility of such systems.

Also, prior art motion simulators tend to be specifically designed for simulation of motion to a specific device such as an airplane trainer. Accordingly, highly complex and specialized mechanisms are utilized. Thus, these systems are incapable of simulating movement of other unrelated devices without extensive and expensive modifications requiring the expenditure of long periods of time.

With the ever-increasing advancement in all the sciences affecting work in space, on the ocean, and under the sea, the need for a tool to solve the problems of working and compensating for moving platforms has become acute. In ocean engineering, wave basins, artificial channels, and wave tanks are expensive, require complex maintenance techniques, and are not completely accurate for testing. Actual tests at sea are extremely costly in time and money, subject to weather conditions, and are not conducive to security restrictions.

SUMMARY OF THE INVENTION

The general purpose of this invention is to provide a motion simulator that is easily modified to simulate motion of various unrelated devices, requires a minimum of space, is easily movable, holds safety hazards to a minimum, is inexpensive, requires minimum power, presents no threat of line breakage or leakage, and is lightweight. To attain this, the present invention provides a plurality of variable-centered pulley wheels. The pulley wheels are rotated about their variable centers at variable speeds. Means for supporting a platform are connected to the pulley wheels, to a plurality of fixed points and to the platform. The means for supporting the platform move with respect to the rotating pulley wheels, thus imparting predetermined movements to the platform. Power means are utilized to drive the pulley wheels.

Accordingly, it is an object of the present invention to minimize power requirements.

Another object of the present invention is to reduce floor loads.

A further object of the present invention is to minimize cost.

Another object of the present invention is to minimize safety hazards.

A further object of the present invention is to maximize mobility.

Another object of the present invention is to remove the threat of hydraulic line breaks and leakage.

A further object of the present invention is to reduce space requirements.

Another object of the present invention is to minimize modification requirements.

A further object of the present invention is to provide motion in a plurality of degrees of freedom.

Other objects and a more complete appreciation of the invention and its many attendant advantages will develop as the same becomes better understood by reference to the following detailed description when considered in connection with the accompanying drawings.

DESCRIPTION OF THE PREFERRED EMBODIMENT

Figure 1:
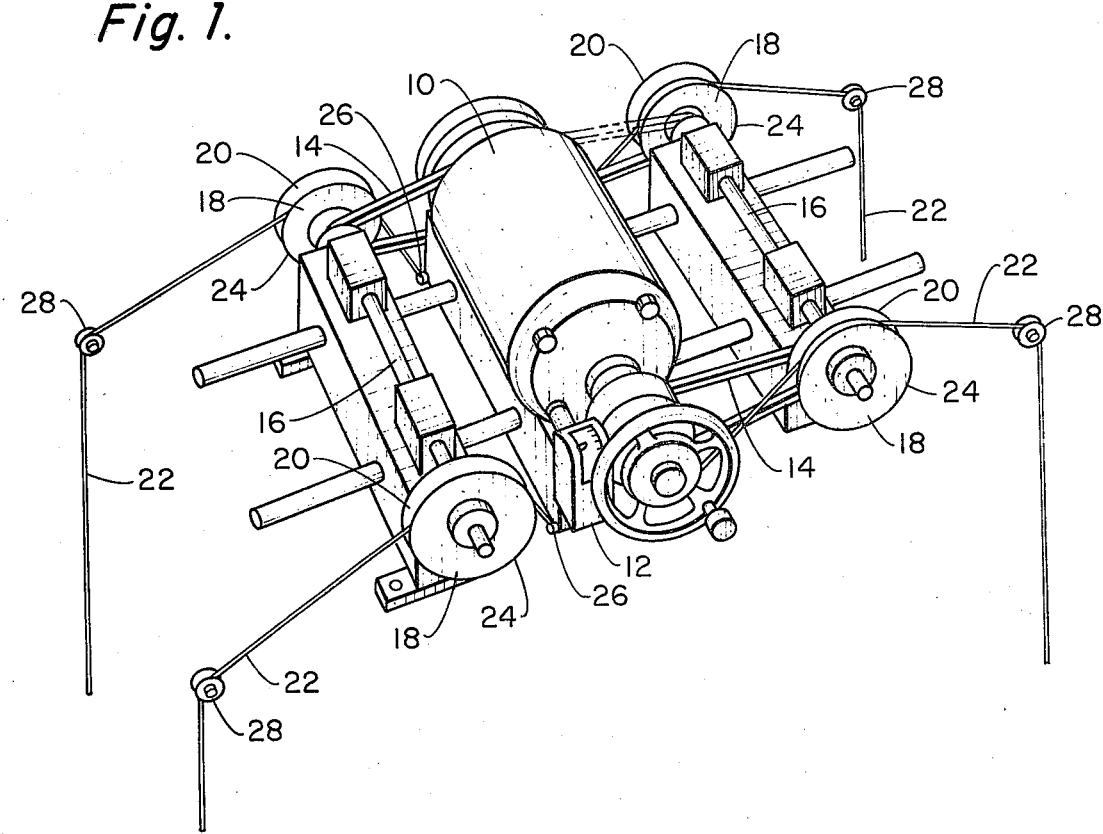
FIG. 1 is an isometric view of a specific embodiment of the present invention.

Referring now to the drawings in detail and more particularly to FIG. 1, the reference character 10 designates the drive motor. Drive motor 10 serves as the power means for the motion simulator of FIG. 1. It is noted that a plurality of drive motors could be employed.

Variable speed control unit 12 regulates the power output of drive motor 10. Pulley belts 14 are connected between drive motor 10 and pulley shafts 16. Pulley belts 14 communicate rotating movement from drive motor 10 to pulley shafts 16. Variable speed control unit 12, pulley belts 14 and pulley shafts 16 are means for imparting variable-speed, rotating motion to variable-centered pulley wheels 18. Such means could be implemented utilizing gears (not shown), complex servo systems (not shown), or other devices commonly known to those skilled in the art.

Variable-centered pulley wheels 18 have grooves 20 which contain support lines 22. Grooves 20 enable support lines 22 to move continuously with respect to pulley wheels 18 while touching the edges 24 of pulley wheels 18.

One end of support lines 22 is connected to fixed points 26. The other end of support lines 22 is connected to a platform (not shown in FIG. 1). The support lines 22 impart predetermined motion to the platform.

Figure 5:
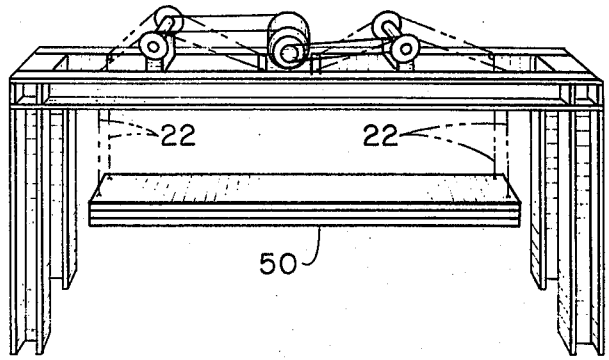
FIG. 5 illustrates support means for a platform.
Figure 6A:
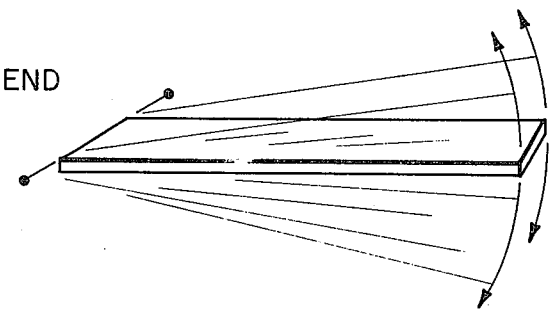
FIG. 6 illustrates twelve different motions achievable with the present invention.
Figure 6B:
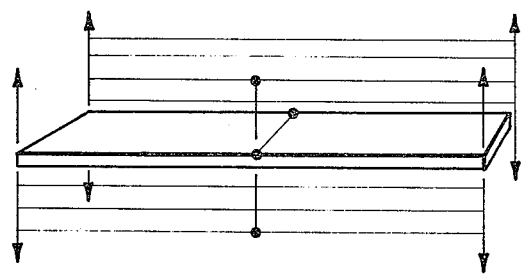
Figure 6C:
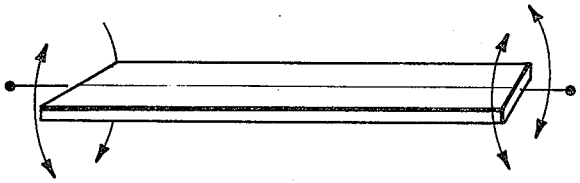
Figure 6D:
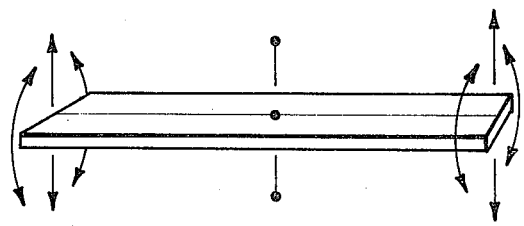
Figure 6E:
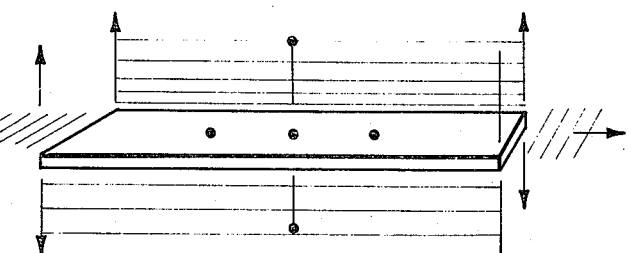
Figure 6F:
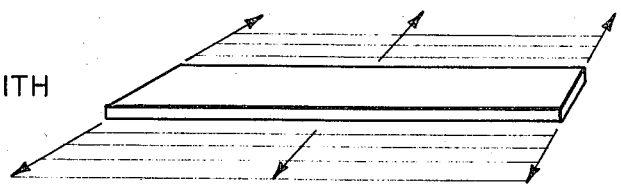
Figure 6G:
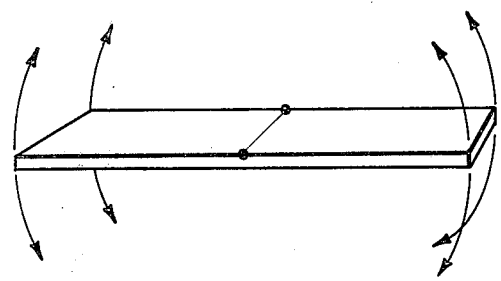
Figure 6H:
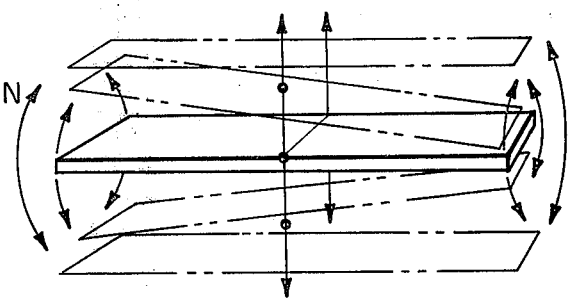
Figure 6I:
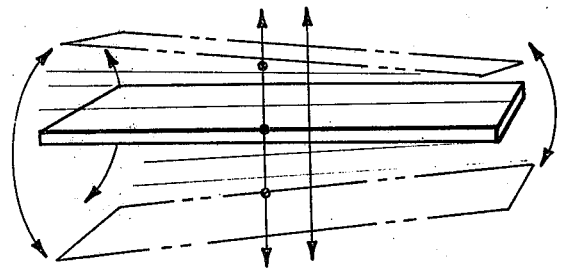
Figure 6J:
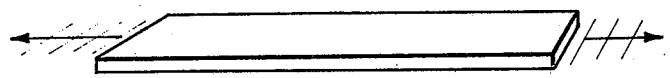
Figure 6K:
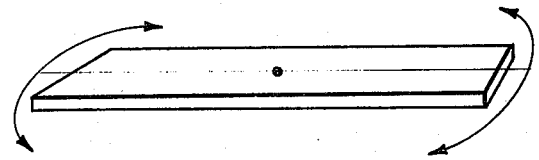
Figure 6L:
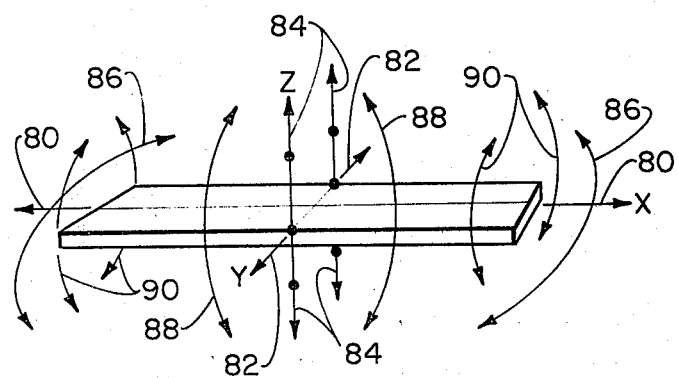

Support lines 22 also pass over and touch idler guides 28. Idler guides 28 direct the forces communicated to the platform by support lines 22 in a vertical plane with respect to the platform as shown in FIG. 1 and FIG. 5. Of course, when idler guides 28 are substantially disposed in the plane of the platform horizontal forces will be imparted to the platform. It is noted that support lines 22, grooves 24, and idler guides 28 serve as means for supporting the platform. The means for supporting the platform may be implemented by other methods as will be shown infra.

Figure 2:
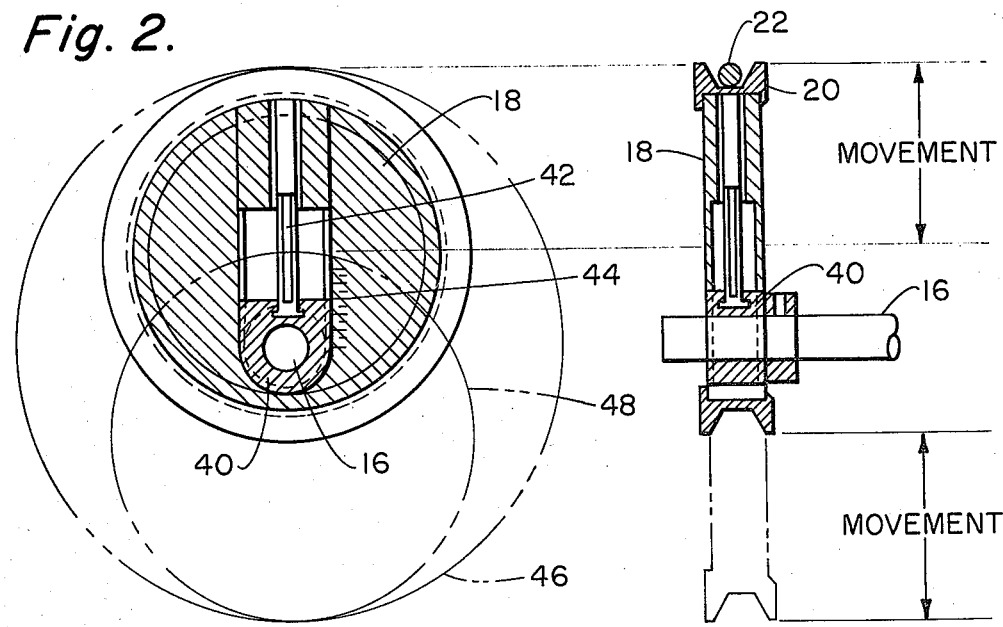
FIG. 2 contains a front and side view of a variablecentered pulley wheel of FIG. 1.

FIG. 2 shows a front and side view of a variablecentered pulley wheel 18 of FIG. 1. Pulley wheel 18 rotates on variable center unit 40 about pulley shaft 16. Variable center unit 40 is positioned by threaded Allen screw 42. The movement imparted to support line 22 is set by coordinating the position of variable center unit 40 with calibrations 44. Dotted lines 46 and 48 illustrate the movement pulley wheel 18 imparts to support line 22 lying in groove 20 when variable center unit 40 is not coincident with the geometric center of pulley wheel 18.

Figure 3:
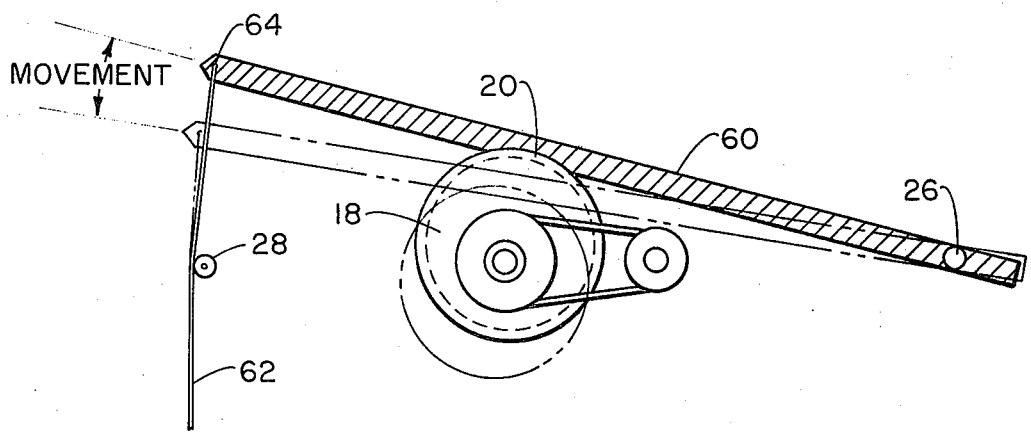
FIG. 3 illustrates a specific embodiment of the present invention.

FIG. 3 illustrates another embodiment of the means for supporting the platform. Rocker arm 60 pivots about fixed point 26. Rocker arm 60 lies in groove 20 and is capable of continuous movement with respect to variablecentered pulley wheel 18. Support line 62 is connected between end 64 of rocker arm 60 and the platform (not shown). Support line 62 passes over and touches idler guide 28. Idler guide 28 directs the force communicated to the platform by rocker arm 60 and support line 62 in a vertical plane with respect to the platform. Of course, when idler guides 28 are substantially disposed in the plane of the platform horizontal forces will be imparted to the platform.

Figure 4:
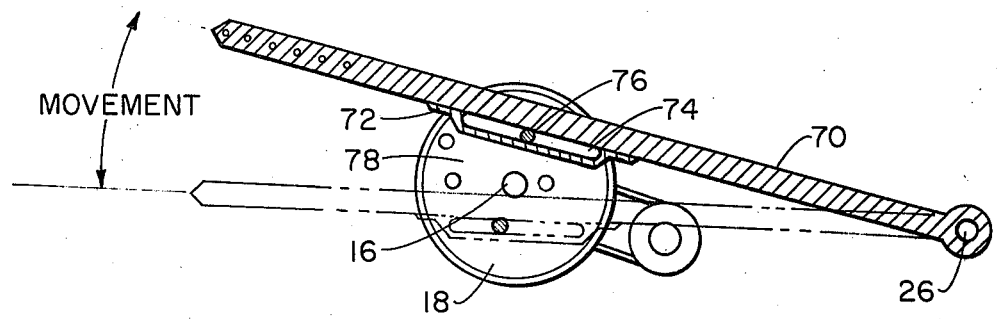
FIG. 4 illustrates a specific embodiment of the present invention.

FIG. 4 illustrates another embodiment of the means for supporting the platform. Rocker arm 70 pivots about fixed point 26. Bar 72, attached to rocker arm 70, contains slot 74. Pin 76, connected to a face 78 of pulley wheel 18, fits into and moves within slot 74, thereby imparting motion to rocker arm 70 as variable-centered pulley wheel 18 rotates about shaft 16.

FIG. 5 illustrates a platform 50 suspended from support lines 22.

FIG. 6 (A - L) illustrates some of the motions the present invention can impart to a platform. The plurality of degrees of freedom comprise three mutually perpendicular axes of linear movement and three axes of rotational movement; one of the axes being normal to the other two. FIG. 6L illustrates the plurality of degrees of freedom. Arrows 80 indicate linear motion along the X-axis. Arrows 82 indicate linear motion along the Y-axis. Arrows 84 indicate linear motion along the Z-axis. Arrows 86 indicate rotational motion about the Z-axis. Arrows 88 indicate rotational motion about the Y-axis. Arrows 90 indicate rotational motion about the X-axis.

It is envisioned that platform 50 of FIG. 5 may be supported from below by rigid rods rather than supported from above by support lines 22.

Also, the variable-centered pulley wheels 18 of FIG. 1 may be connected in pairs or in tandem with an infinite number of spatial relationships. The number of motions and the number of platforms to which motion is imparted are theoretically infinite. In a simple case, one pulley wheel 18 may be sufficient while other motions may require a multitude of pulley wheels 18.

It is envisioned that some but not all of the uses of the present invention will include motion simulation of aircraft, ships at sea, gang planks, payloads being lowered from or raised to support ships, sunken submarines and other sunken objects, oil platforms, and ships at sea transporting payloads between each other.

Obviously many modifications and variations of the present invention are possible in light of the above teachings. It is therefore to be understood that within the scope of the appended claims the invention may be practiced otherwise than as specifically described.

I claim:

1. A motion simulator system capable of motion in a plurality of degrees of freedom, comprising:
   a platform;
   a plurality of calibrated, variable-centered pulley wheels having means for adjusting the placement of a variable center of each said pulley wheel about which each said pulley wheel rotates;
   a plurality of fixed points equal in number to said plurality of pulley wheels;
   a plurality of means for supporting said platform, each said support means being connected between one said fixed point and said platform, each said support means mechanically communicating with and having the capability of continuous movement with respect to one of said pulley wheels, each said pulley wheel being capable of imparting a predetermined movement to the support means mechanically communicating therewith that is a function of the placement of said variable center of said pulley wheels;
   means connected to said pulley wheels for imparting variable-speed, rotating motion to said pulley wheels about the variable center of said variable centered pulley wheels; and
   power means connected to said variable-speed, rotating motion imparting means, whereby when said variable-speed, rotating motion imparting means is actuated for rotating said pulley wheels predetermined movements are imparted to said platform.

2. The motion simulator of claim 1 wherein said means for supporting said platform comprises:
   a plurality of rocker arms each having a first and a second end, each said first end being connected to one of said fixed points and pivoting therearound;
   a plurality of pins, equal in number to said plurality of pulley wheels, one pin being connected to one face of each said pulley wheel;
   means connected to each said rocker arm for receiving said pins, said means allowing said pins to continuously move with respect to said rocker arms; and
   means connected between each said second end of said rocker arms and said platform for supporting said platform from said second ends of said rocker arms.

3. The motion simulator of claim 2 wherein said means for receiving said pins comprises:
a plurality of bars, equal in number to said rocker arms, each having a slot within which one said pin may continuously move with respect to one said rocker arm.

4. The motion simulator of claim 2 wherein said means for supporting said platform from said second ends of said rocker arms comprises:
a plurality of idler guides; and
flexible means for supporting said platform connected between each said second end of said rocker arms and said platform, each said flexible means passing over and touching one said idler guide whereby forces are imparted to said platform at each point of connection with said platform when said pulley wheels are rotated.

5. The motion simulator of claim 1 wherein said means for supporting said platform comprises:
a plurality of rocker arms each having a first and second end, each said first end being connected to one of said fixed points and pivoting therearound, each said rocker arm touching the edge of one of said pulley wheels;
means connected to the edge of said pulley wheels for allowing said rocker arms to continuously move with respect to said pulley wheels; and
means connected between said second ends of said rocker arms and said platform for supporting said platform from said second ends of said rocker arms.

6. The motion simulator of claim 5 wherein said means for supporting said platform from said second ends of said rocker arms comprises:
a plurality of idler guides; and
flexible means for supporting said platform connected between each said second end of said rocker arms and said platform, said means passing over and touching one said idler guide whereby forces are imparted to said platform at each point of connection with said platform when said pulley wheels are rotated.

7. The motion simulator of claim 1 wherein said means for supporting said platform comprises:
a plurality of support lines each having a first and second end, each said first end being connected to one of said fixed points, each said second end being connected to said platform, each said support line touching the edge of one of said pulley wheels;
means connected to the edge of said pulley wheels for allowing said support lines to continuously move with respect to said pulley wheels; and
a plurality of idler guides over which said support lines respectively pass and touch whereby forces are imparted to said platform at each point of connection with said platform when said pulley wheels are rotated.

8. The motion simulator of claim 1 wherein said plurality of pulley wheels are disposed in tandem.

9. The motion simulator of claim 1 wherein said plurality of pulley wheels are disposed in parallel.

10. A motion simulator system capable of motion in a plurality of degrees of freedom, comprising:
a platform;
a plurality of calibrated, variable-centered pulley wheels having means for adjusting the placement of a variable center of each said pulley wheel about which each said pulley wheel rotates;
a plurality of fixed points equal in number to said plurality of pulley wheels;
a plurality of means for supporting said platform equal in number to said pulley wheels, each said support means being connected between one said fixed point and said platform, each said support means mechanically communicating with and having the capability of continuous movement with respect to one said pulley whell, each said pulley wheel being capable of imparting a predetermined movement to a respective one of said support means that is a function of the placement of said variable center of said pulley wheels;
means connected to said pulley wheels for imparting variable-speed rotating motion to said pulley wheels about the variable center of said variable centered pulley wheels; and
power means connected to said variable-speed, rotating motion imparting means, whereby when said variable-speed, rotating motion imparting means is actuated for rotating said pulley wheels predetermined movements are imparted to said platform.

11. The motion simulator of claim 10 wherein said means for supporting said platform comprises:
a plurality of rocker arms each having a first and a second end, each said first end being connected to one said fixed point and pivoting therearound;
a plurality of pins, equal in number to said plurality of pulley wheels, one pin being connected to one face of each said pulley wheel;
means connected to each said rocker arm for receiving said pins, said means allowing said pins to continuously move with respect to said rocker arms; and
means connected between each said second end of said rocker arms and said platform for supporting said platform from said second ends of said rocker arms.

12. The motion simulator of claim 11 wherein said means for receiving said pins comprises:
a plurality of bars, equal in number to said rocker arms, each having a slot within which one said pin may continuously move with respect to one said rocker arm.

13. The motion simulator of claim 11 wherein said means for supporting said platform from said second ends of said rocker arms comprises:
a plurality of idler guides; and
flexible means for supporting said platform connected between each said second end of said rocker arms and said platform, each said flexible means passing over and touching one said idler guide whereby vertical forces are imparted to said platform at each point of connection with said platform when said pulley wheels are rotated.

14. The motion simulator of claim 10 wherein said means for supporting said platform comprises:
a plurality of rocker arms each having a first and second end, each said first end being connected to one said fixed point and pivoting therearound, each said rocker arm touching the edge of one said pulley wheel;

means connected to the edge of said pulley wheels for allowing said rocker arms to continuously move with respect to said pulley wheels; and means connected between said second ends of said rocker arms and said platform for supporting said platform from said second ends of said rocker arms.

15. The motion simulator of claim 14 wherein said means for supporting said platform from said second ends of said rocker arms comprises:

a plurality of idler guides; and flexible means for supporting said platform connected between each said second end of said rocker arms and said platform, said means passing over and touching one said idler guide whereby vertical forces are imparted to said platform at each point of connection with said platform when said pulley wheels are rotated.

16. The motion simulator of claim 10 wherein said means for supporting said platform comprises:

a plurality of support lines each having a first and second end, each said first end being connected to one said fixed point, each said second end being connected to said platform, each said support line touching the edge of one said pulley wheel;

means connected to the edge of said pulley wheels for allowing said support lines to continuously move with respect to said pulley wheels; and a plurality of idler guides over which said support lines respectively pass and touch whereby forces are imparted to said platform at each point of connection with said platform when said pulley wheels are rotated.

17. The motion simulator of claim 10 wherein said plurality of pulley wheels are disposed in tandem.

18. The motion simulator of claim 10 wherein said plurality of pulley wheels are disposed in parallel.

* * * * *